United States Patent [19]

Wong et al.

[11] Patent Number: 4,505,563
[45] Date of Patent: Mar. 19, 1985

[54] ELECTRONIC SHUTTER FOR STILL CAMERAS

[75] Inventors: Wan C. Wong, North Point, Hong Kong; Shigeru Oshima, Tokyo, Japan

[73] Assignee: W. Haking Enterprises Limited, Hong Kong, Hong Kong

[21] Appl. No.: 477,248

[22] Filed: Mar. 21, 1983

[51] Int. Cl.³ .............................................. G03B 9/40
[52] U.S. Cl. ................................. 354/234.1; 354/230; 354/247
[58] Field of Search ................... 354/230, 234.1, 235.1, 354/246, 247, 248, 436

[56] References Cited

U.S. PATENT DOCUMENTS

| | | | |
|---|---|---|---|
| 3,241,471 | 3/1966 | Burgarella | 354/235.1 |
| 3,820,131 | 6/1974 | Tanaka | 354/247 |
| 3,893,134 | 7/1975 | Brauning | 354/436 |
| 3,916,425 | 10/1975 | Tanaka | 354/436 |
| 3,995,295 | 11/1976 | Douglas | 354/235.1 |

Primary Examiner—A. A. Mathews
Attorney, Agent, or Firm—Russell E. Hattis

[57] ABSTRACT

An electronic shutter mechanism for a still camera comprises a shutter blade, preferably carrying a solenoid armature, urged by a first spring into an initial lens aperture closing position. An initially latched actuating member for moving the shutter blade to a lens aperture exposing position carries a normally energized solenoid coil to attract the shutter blade carried armature thereto so that the shutter blade moves with the actuating member until the coil is deenergized. When the actuating member is unlatched, a second spring urges the actuating member and the shutter blade magnetically attached thereto into a lens aperture opening position against the return force of the first spring. Upon the unlatching of the actuating member a timing circuit establishes a timing period depending upon the amount of ambient light, after which the solenoid coil is deenergized so the first spring returns the shutter blade quickly to a lens aperture closing position.

6 Claims, 4 Drawing Figures

ELECTRONIC SHUTTER FOR STILL CAMERAS

DESCRIPTION

1. Technical Field

The present invention generally relates to shutter mechanisms for still cameras and, in particular, to an improved electromechanical shutter construction.

2. Background of the Invention

Generally, conventional electronic shutters for still cameras operate by retracting shutter blades to expose the camera aperture and conceal the aperture by converging the blades when an electronic circuit determines the film has been exposed to a sufficient quantity of illumination. An electronic circuit of a type generally known in the art determines the proper duration of shutter opening in accordance with object luminance, film speed and other exposure parameters. One element of conventional shutter timing circuitry is an electromagnetic transducer, such as a solenoid.

In prior art electronic shutter constructions, the solenoid is mounted independent from the shutter blades with its position being fixed relative to the movement of the shutter blades. The energization or de-energization of the solenoid coil results in a small displacement of a reciprocating solenoid armature which is coupled to control the shutter blades by means of various mechanical arms and levers.

However, such mechanical coupling between the solenoid armature and shutter blades complicates the shutter construction, prevents consistent shutter operation because of friction and resilience of mechanical parts and thus, results in a critical time-delay between displacement of the solenoid armature and the eventual closing of the shutter blades to terminate film exposure. This time-lag may be significant when it is considered that a typical effective time of shutter opening is on the order of milliseconds.

Hence, it is one object of the present invention to simplify the construction of electronic shutter mechanisms for still cameras to effectively eliminate any mechanical time delay in the shutter mechanism, particularly delay arising from solenoid armature displacement and closing or converging of the shutter blades. Another object of the present invention is to provide an electronic shutter mechanism which smoothly and consistently transfers motion from the solenoid armature to the shutter blades to achieve reliable and uniform shutter operation. Hence, a need existed for an electronic shutter mechanism for still cameras which would meet the above objectives and further facilitate the proper exposure of film in accordance with the parameters of object luminance, film speed, object distance and others.

SUMMARY OF THE INVENTION

In accordance with the present invention, an electronic shutter mechanism for still cameras has been developed which minimizes mechanical coupling to result in a simplified and more compact shutter construction. Generally, the present invention has eliminated any mechanical coupling between the electromagnetic transducer, preferably a solenoid, and the shutter blades. In the preferred form of the present invention, the solenoid is disassembled so that an armature is carried on one shutter blade and interacts preferably with a magnetically charged U-shaped shoe carried on an adjacent shutter actuation member. The shoe is magnetized by a solenoid coil carried on leg of the U-shaped shoe. Thus the time-delay in the closing mode of operation found in the prior art shutter mechanisms and arising from displacement of a solenoid armature and mechanical transferral of such displacement to the shutter blades is minimized.

Specifically, the electronic shutter mechanism of the present invention rigidly mounts either the solenoid coil or solenoid armature plate onto either of two shutter blades. The shutter blades are joined by at least one connecting linkage to synchronize their movements. The corresponding solenoid coil or armature, depending on the element mounted to a shutter blade, is rigidly mounted to a shutter actuation bar adjacent to the shutter blade carrying the solenoid coil or armature. As mentioned, the solenoid employed in the present invention does not utilize a conventional reciprocating armature positioned within the solenoid coil but rather is comprised preferably of a U-shaped shoe, riveted to an extension arm on the actuation member (or shutter blade), and over one leg of which is carried a solenoid coil. The solenoid armature is attached to a similar extension arm on one shutter blade.

The solenoid coil generates a magnetic field so that each leg of the U-shaped shoe becomes an opposing magnetic pole. Upon generating the magnetic field, the armature becomes attracted to and connected with the ends of the legs of the U-shaped shoe. By this manner of magnetic connection, the actuation member and one shutter blade are coupled so that the movement of the actuation member and shutter blade are moved together during the opening mode of the shutter mechanism. Upon proper exposure of the film, the shutter timing circuitry terminates the energization of the solenoid coil and consequently the magnetic attractive force of the U-shaped shoe so that the solenoid armature ceases to be attracted to the ends of the shoe. As a result, the shutter blade carrying the armature (or coil) is released from coupling with the shutter actuation member. Upon release, the shutter blades are drawn to a closed position by a spring or other biasing means.

The present invention is further described and disclosed through a preferred embodiment presented in the drawings and set forth below in the written description.

DETAILED DESCRIPTION OF THE PREFERRED EMBODIMENT

Figure 1:
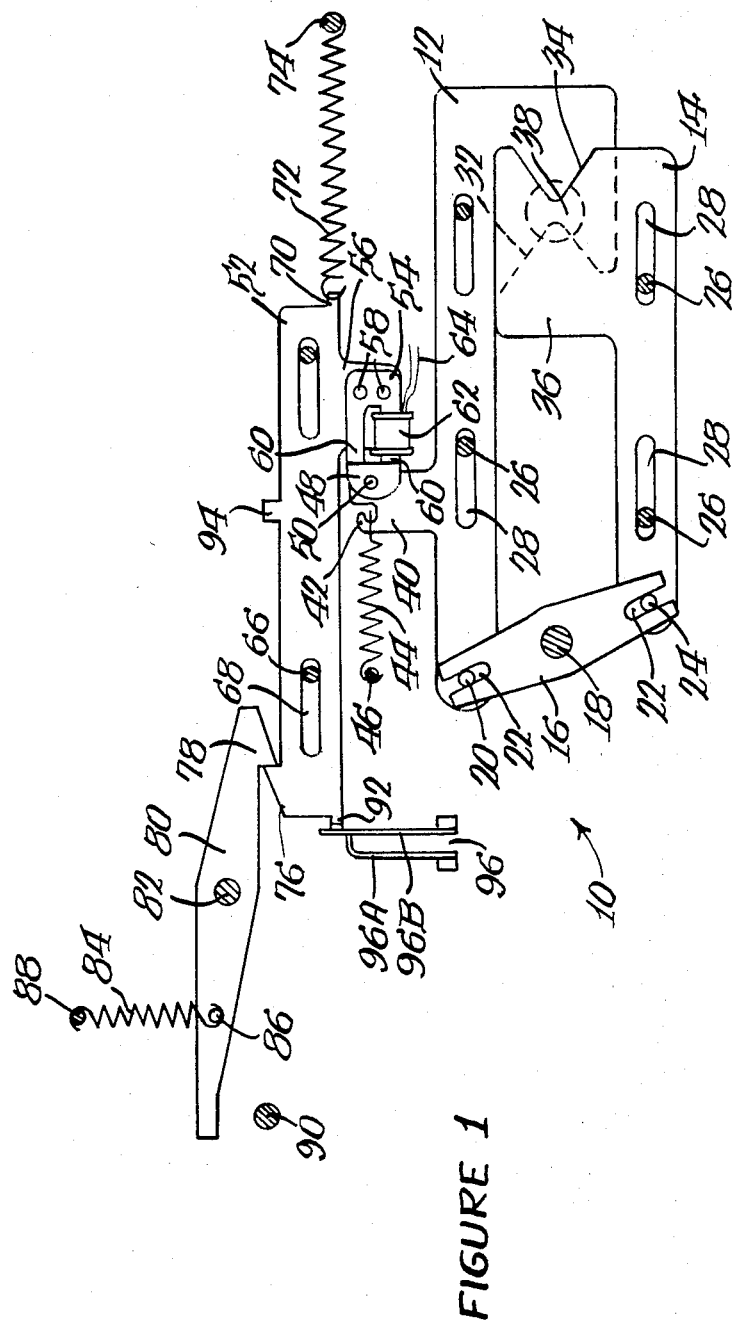
FIG. 1 is a perspective view of the preferred shutter mechanism of the present invention illustrating the mechanism in its closed and fully cocked position.

Referring now to the drawings, FIG. 1 illustrates the preferred shutter mechanism of the present invention generally indicated by reference numberal 10. Shutter mechanism 10 is comprised of a first shutter blade 12 and a second shutter blade 14 which blades are preferably coupled along one end by at least one connecting linkage 16. Linkage 16 is pivotally mounted on stationary post 18 and engages first blade 12 and second blade 14 through the positioning of pin 20 of first blade 12 and pin 24 of second blade 14 in radial slots 22 located at both ends of linkage 16.

First blade 12 and second blade 14 are slideably moveable along guide pins 26 which glide within guide slots 28 in the blades. The length of guide slots 28 act as a limitation on the movement of first blade 12 and second blade 14 thereby determining the maximum retraction of blades 12 and 14. First blade 12 further includes an aperture closure fin 30 having a V-shaped notch 32 (shown in phantom FIG. 1) which opposes a V-shaped notch 34 on an aperture closure fin 36 of second blade 14. When shutter mechanism 10 is in a lens closing position, closure fins 30 and 36 conceal lens aperture 38. Because first blade 12 and second blade 14 are coupled by linkage 16 pivoting on a stationary pin 18, movement of first blade 12 in one direction (to the right in FIG. 1) effects movement of second blade 14 in an opposing direction (to the left), which moves aperture fins 30 and 36 so that notches 32 and 34 become opposed to define an aperture 36' uncovering lens aperture 38 as shown in FIG. 2.

Figure 2:
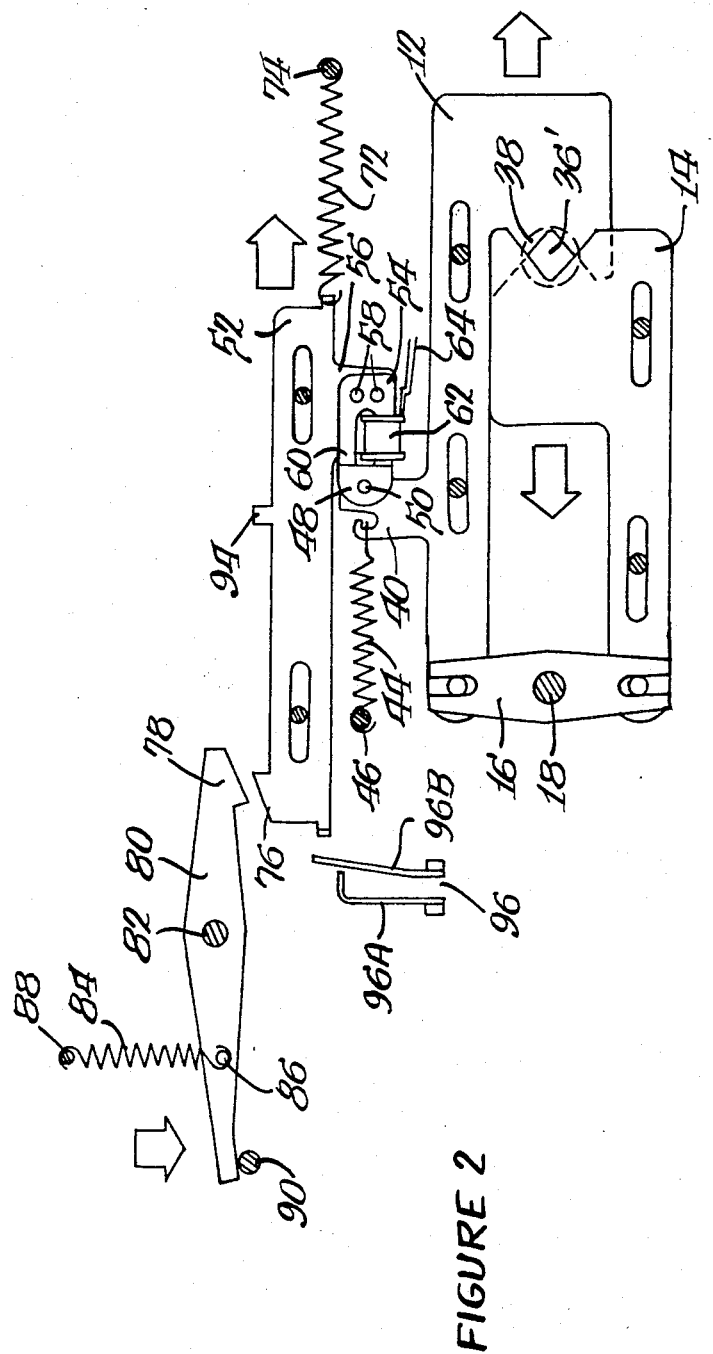
FIG. 2 is the same view as FIG. 1 illustrating the preferred shutter mechanism in the shutter opening mode of operation.
Figure 4:
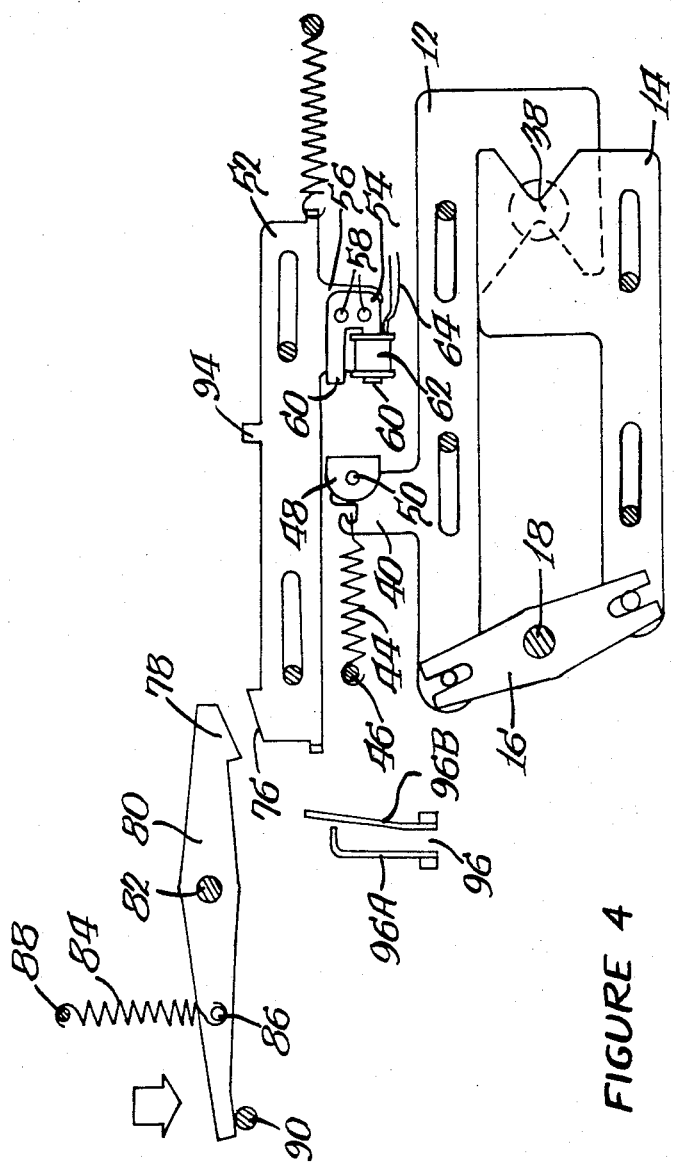
FIG. 4 is a perspective view of the preferred shutter mechanism of the present invention illustrating the mechanism in a shutter closing mode of operation but prior to shutter recocking by advancement of photographic film.

FIGS. 1, 2, and 4 disclose first blade 12 as further including a preferred extension arm 40 having a hook 42 which is engaged by end of a coil spring 44. While the preferred form of the present invention utilizes coil springs as biasing elements, it is understood that any form of biasing element known in the art may be used. Spring 44 is suspended from a retention pin 46 which is positioned relative to aperture 38 in order for spring 44 to urge first blade 12 to the left as viewed in FIG. 1 and second blade 14 to the right to move aperture fins 30 and 36 over lens aperture 38. When shutter mechanism 10 is in a lens closing position, as in FIG. 1, spring 44 is in a fully compressed state and when shutter mechanism 10 is in a lens opening position, as shown in FIG. 2, spring 44 becomes fully extended or loaded.

On an opposing side of arm 40, an armature plate 48 is rigidly mounted to arm 40 preferably by means of a rivet 50. Armature 48 is manufactured from iron, steel or any magnetically attractable alloy known in the art. The armature 48 is except at the termination of a film exposure operation held by magnetic attraction against the legs of a magnetic, U-shaped shoe 54. Shoe 54 is comprised of two coplanar and parallel legs 60 and is rigidly secured on an extension arm 56 of a shutter actuation bar 52 preferably by means of rivets 58. Legs 60 of shoe 54 are magnetized by energization of a solenoid coil 62 surrounding and carried on one of the legs 60. The solenoid is energized except at the termination of an exposure operation.

Figure 3:
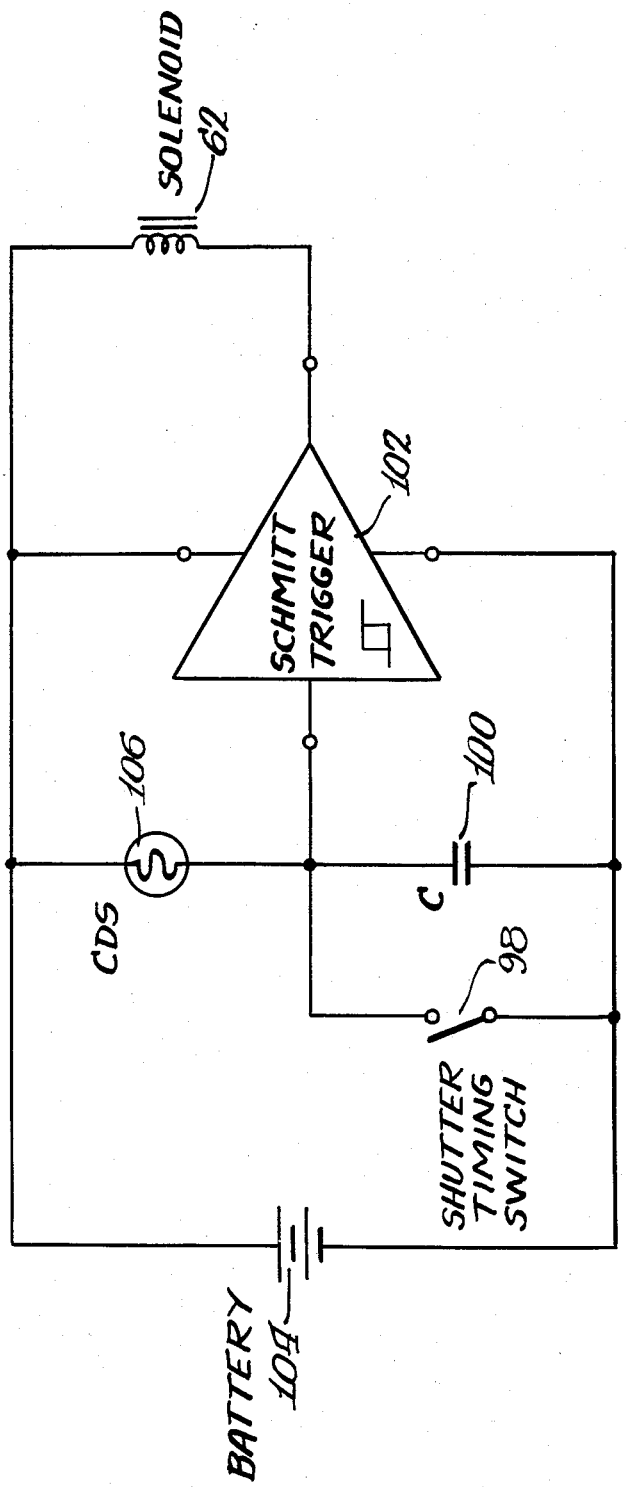
FIG. 3 is a schematic diagram of the preferred shutter timing circuitry employed in the present invention.

Solenoid coil 62 is connected to the shutter timing circuitry disclosed in FIG. 3 by means of leads 64. It should be noted that the present invention does not use a conventional solenoid which employs a reciprocating armature positioned within the solenoid coil, but rather utilizes a separate U-shaped shoe 54 carrying the coil, the legs of the shoe being confronted by the armature 48. In the preferred form of the present invention, the solenoid coil 62 and the shoe 54 are carried on bar 52 with first blade 12 carrying the armature 48, in order to minimize the weight and structural complexity of blade 12. Less desirable, solenoid coil 62 and shoe 54 could be carried on first blade 12 with armature 48 being carried by bar 52 without effecting the operational modes of shutter mechanism 10.

Bar 52 is slideably moveable along guide pins 66 which slide within slides 68. One end of bar 52 carries a hook 70 which is attached to a relatively large coil spring 72. Spring 72 is suspended on another end from retention post 74. When shutter mechanism 10 is in a lens closing position, as in FIG. 1, spring 72 is completely extended and loaded to urge bar 52 upon release toward post 74 when shutter mechanism 10 is actuated. The tension of spring 72 is greater than the tension of opposing spring 44 so that upon shutter actuation, bar 52 is urged toward post 74 drawing first blade 12 in the same direction because of magnetic attraction between armature 48 and shoe 54 developed by energized solenoid coil 62.

The other end of actuation bar 52 opposite from the end connected to spring 72 includes a cocking ridge 76 which engages retention notch 78 on a shutter release arm 80 which maintains a shutter mechanism 10 in a closed position. Shutter release arm 80 is pivotally mounted on post 82 and is urged by a coil spring 84 to maintain engagement of retention notch 78 with cocking ridge 76. Spring 84 is suspended between pin 86 on release arm 80 and post 88 mounted within the camera structure. An abutment post 90 is provided to stop further counter-clockwise travel of retention arm 80 upon release of actuation bar 52.

Finally, actuation bar 52 is provided with a lug 92 and a lug 94. Lug 92 is in proximity with cocking ridge 76 and urges electrical contact leaves 96a and 96b of switch 98 in a closed position when actuation bar 52 is engaged by arm 80. When arm 80 releases actuation bar 52 to initiate the opening operational mode of shutter mechanism 10, lug 92 ceases abutment with contact leaf 96b causing it to bend away from leaf 96a so disclosed in FIG. 2 thereby opening switch 98. Hence, the structural proximity of lug 92 and ridge 76 is important in order to obtain the synchronized opening of switch 98 upon release of actuation bar 52. Switch 98 is a part of the shutter timing circuitry disclosed in FIG. 3 to be discussed later in greater detail.

Lug 94 is provided as a means of engaging a mechanism (not shown in the drawings) which recocks actuation bar 52 by re-engagement of ridge 76 with notch 78 during the film advancement operation which occurs after the completion of one shutter operation.

FIG. 2 discloses the shutter opening operation of the present invention. When release arm 80 is depressed for picture taking in the manner illustrated by the arrow, release arm 80 moves in a counter-clockwise manner about post 82 to abut against post 90. Upon doing so, retention notch 78 disengages cocking ridge 76 permitting actuation bar 52 to be drawn upon by spring 72 in the direction of the arrow in FIG. 2. During the shutter opening operation, the voltage across solenoid coil 62 remains energized so that armature 48 remains attached to shoe 54. By such magnetic connection, first blade 12 is drawn by actuation member 52 toward post 74. As a consequence of the movement of first blade 12, second blade 14 travels in a direction opposite to that of first blade 12 because of the clockwise pivoting of connecting linkage 16 about post 18. By such synchronized movement between first blade 12 and second blade 14, aperture fins 30 and 36 are drawn apart to expose aperture 38.

As actuation bar 52 moves toward post 74, lug 92 releases contact leaf 96B opening timing switch 98. As can be seen from the circuitry schematic of FIG. 3, when timing switch 98 is closed, capacitor 100 is completely discharged so that the input voltage to a Schmitt trigger circuit 102 is zero (reference to earth) and its output voltage is also zero (reference to earth) such that the voltage across the solenoid coil 62 is high. The solenoid coil 62 is thus energized. The magnetic field in legs 60 of shoe 54 thus continue to attract armature 48.

Upon opening of switch 98, capacitor 100 begins acquiring charge from battery 104 through preferably a cadmium sulfide photoconductive cell 106. While a cadmium sulfide cell is preferred in the present shutter timing circuitry, it is contemplated that other photoresistor cells, such as cadmium selenide may also be used. The rate of charge of capacitor 100 is a function of the resistance offered by cell 106 which in turn is a function of object luminance. When the charge stored by capacitor 100 reaches a voltage equal to the triggering voltage of Schmitt Trigger 102, the output voltage from Schmitt Trigger 102 rises to high (reference to earth). The voltage across the solenoid coil 62 is thus zero and the solenoid coil 62 is de-energized. Hence, the magnetic attraction created by coil 62 is terminated breaking the attracting force between armature 48 and shoe 54 nearly instantaneously, so that the cocked spring 44 rapidly pulls blade 12 to the left to close the lens aperture 38, as shown in FIG. 4.

FIG. 4 discloses that as first blade 12 and second blade 14 return to their closed positions actuation bar 52 is maintained in a fully released position as a result of the continued tension being exerted by spring 72.

Shutter mechanism 10 of the present invention more accurately achieves the correct effective time of shutter opening by alleviating a major ground of timing error namely mechanical time-lag or time-delay. Specifically, the present invention integrates the solenoid coil and armature directly onto one of the shutter blades and the shutter actuation bar. The necessity of mechanically transferring the small displacement of a conventional solenoid armature to one of the shutter blades is eliminated so that mechanical time delay is practically null. Hence, the effective time of shutter opening, as controlled by the shutter timing circuitry, is least susceptable to error from improper film exposure.

The effective time of shutter opening is proportional to the time for capacitor 100 to acquire sufficient charge to reach the selected triggering voltage of Schmitt Trigger 102 which in turn is proportional to object luminance if a linear-log characteristic of photoresistor cell 106 is assumed. By choosing proper calibration constants the effective time of shutter opening can closely approximate the time for correct exposure of film. Though certain electrical delays remain inherent in the shutter timing circuitry, such delay is typically on the order of microseconds which is insignificant relative to shutter opening times which are on the order of milliseconds.

FIG. 4 discloses the present shutter mechanism 10 at the completion of the shutter opening operation where aperture 38 is again completely concealed but shutter mechanism 10 has yet to be re-cocked for any further shutter opening. Before re-cocking, the distance between armature 48 and legs 60 of shoe 54 is the greatest. Upon the next film advancement operation, actuation bar 52 through a mechanism which utilize lug 94, (not shown in FIG. 4) is drawn against spring 72 returning it to a start position. Bar 52 continues to be drawn by spring 72 until the ends of legs 60 of shoe 54 abut against armature 48. At the same time, lug 92 depresses leaf contact 96B against leaf 96A closing switch 98 which immediately discharges capacitor 100. Upon discharge of capacitor 100, a magnetic field is again created by solenoid coil 62 causing armature 48 and shoe 54 to become electromagnetically connected. The recocking operational mode is completed when retention notch 78 snaps down and over cocking ridge 76 resetting the entire mechanism to again initiate a shutter opening operation.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to a particular embodiment disclosed as the best mode contemplated for carrying out the invention, but that the invention will include all embodiments falling within the scope of the appended claims.

I claim:

1. An electronic shutter mechanism for a still camera having manually operable shutter operating means, said mechanism comprising, in combination: shutter blade means including a first magnetic coupling means carried by said shutter blade means; first biasing means for urging said shutter blade means into an initial lens aperture closing position; initially latched actuating means for moving said shutter blade means from said initial to a lens aperture exposing position, said actuating means carrying a second magnetic coupling means controllably releasably engageable with said first magnetic coupling means, one of said first and second magnetic coupling means including a normally energized solenoid coil and the other including an armature attracted by the initially energized solenoid coil so that said shutter blade means moves with said actuating means until the coil is de-energized; second biasing means for urging said actuating means when unlatched into a lens aperture opening position where the actuating means will move said shutter blade means to said lens aperture opening position against the return force of said first biasing means; means for initially energizing said solenoid coil so that said shutter blade means is attracted and is connected with said actuating means until the solenoid is de-energized; timing means responsive to the unlatching of said actuating means for becoming operative to establish a timing period after which period said solenoid coil is de-energized so that said shutter blade means is pulled away from said actuating means by said first biasing means quickly to move said shutter blade means to said lens aperture closing position; and means responsive to operation of said shutter operating means for unlatching said actuating means.

2. The shutter mechanism of claim 1 wherein said armature is carried by said shutter blade means and said coil is carried by said actuating means.

3. The shutter mechanism of claim 1 wherein said coil is mounted on one leg of a U-shaped core-forming shoe and said armature is attracted to the ends of said legs.

4. An electronic shutter mechanism for a still camera having manually operable shutter operating means, said mechanism including, in combination: a first shutter blade carrying a first magnetic coupling means; a second shutter blade; means interconnecting said first and second blades so that the first and second blades move relative to one another between initial lens aperture closing and lens aperture exposing positions; first biasing means for urging said shutter blades into said initial aperture closing positions; initially latched actuating means for moving said first shutter blade from said initial to said lens aperture exposing position, said actuating means carrying a second magnetic coupling means controllably releasably engageable with said first magnetic coupling means, one of said first and second magnetic coupling means being a normally energized solenoid and the other being an armature attracted by the initially energized coil so that said first shutter blade moves with said actuating means until the coil is de-energized; second biasing means for urging said actuating means when unlatched into a lens aperture opening position where the actuating means will pull said first shutter blade to said lens opening position against the return force of said first biasing means; means for initially energizing said solenoid coil so that said first blade is attracted and is connected with said actuating means until the solenoid is de-energized; timing means responsive to the unlatching of said actuating means for becoming operative to establish a timing period after which said solenoid coil is de-energized so that said first shutter blade is pulled away from said actuating means by said first biasing means quickly to move said shutter blades to said lens aperture closing position; and means responsive to operation of said shutter means for unlatching said actuating means.

5. The electronic shutter mechanism of claim 1, wherein said timing means is responsive to ambient light so that said timing period depends upon the amount of said ambient light.

6. The electronic shutter mechanism of claim 4, wherein said timing means is responsive to ambient light so that said timing period depends upon the amount of said ambient light.

* * * * *